United States Patent [19]
Gérard

[11] Patent Number: 4,791,266
[45] Date of Patent: Dec. 13, 1988

[54] APPARATUS FOR SUPPLYING ELECTRIC CURRENT TO A WELDING OR CUTTING TORCH

[75] Inventor: Marhic Gérard, Cergy, France

[73] Assignee: L'Air Liquide, Paris, France

[21] Appl. No.: 907,739

[22] Filed: Sep. 15, 1986

[30] Foreign Application Priority Data
Sep. 16, 1985 [FR] France ............... 85 13675

[51] Int. Cl.⁴ .............................................. B23K 9/00
[52] U.S. Cl. ............................ 219/121.48; 219/136; 219/75; 219/121.51
[58] Field of Search ................... 219/136, 137 R, 74, 219/75, 121 PM, 121 PQ, 121 P, 121 PC; 313/231.31, 231.41, 231.51

[56] References Cited
U.S. PATENT DOCUMENTS

| | | | |
|---|---|---|---|
| 2,512,707 | 8/1948 | Anderson | 219/75 |
| 2,681,402 | 6/1954 | Muller | 219/74 |
| 3,089,944 | 5/1963 | Mathews | 219/74 |
| 3,413,436 | 11/1968 | Tallman | 219/75 |
| 3,746,832 | 7/1973 | Bernard et al. | 219/136 |
| 3,832,520 | 8/1974 | Glasser | 219/74 |
| 4,145,595 | 3/1979 | Keller et al. | 219/75 |
| 4,443,683 | 4/1984 | Watts | 219/74 |

FOREIGN PATENT DOCUMENTS
79019 11/1982 European Pat. Off. .

Primary Examiner—M. H. Paschall
Attorney, Agent, or Firm—Lee C. Robinson, Jr.

[57] ABSTRACT

An arc welding kit comprising a torch head, a combined source of electric current and of fluid for welding and a composite cable connectible between the fluid/current source and the torch head by means of coupling connectors.

The upstream extremity of the composite cable has a coupling connector identical to that of the torch head whereas its downstream extremity has a coupling connector identical to that of the combined source. This enables two or more such cables to be connected in series to extend the range of the torch. Furthermore, an elbow comprising the same coupling connectors may be placed between the torch head and the composite cable, to turn the torch head through a desired angle.

The invention is particularly applicable to plasma cutting torches ignited by short-circuiting.

14 Claims, 2 Drawing Sheets

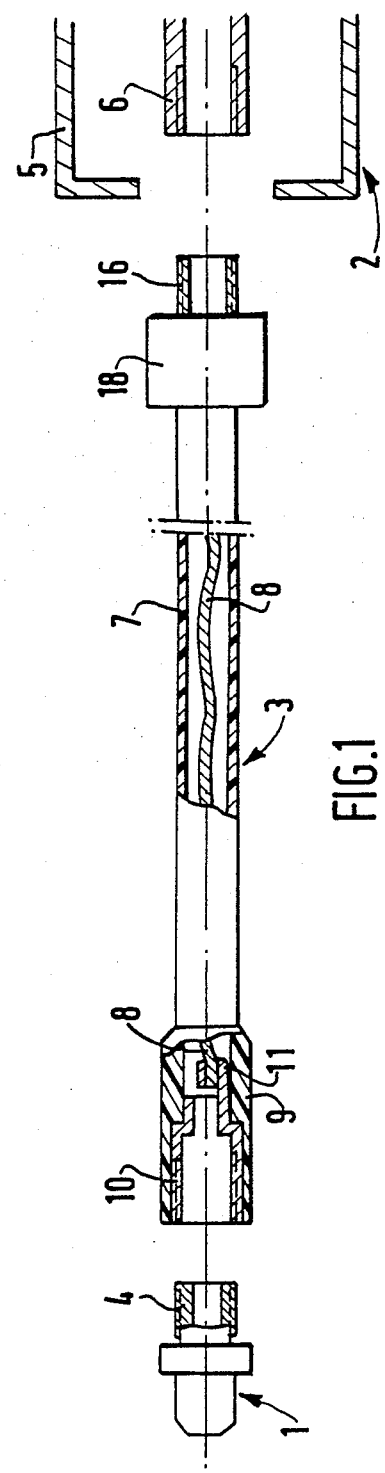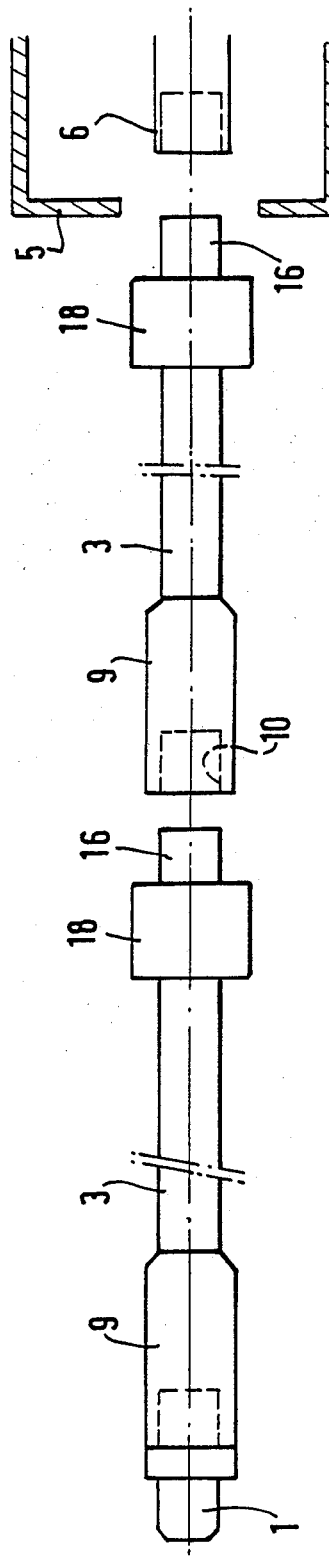

APPARATUS FOR SUPPLYING ELECTRIC CURRENT TO A WELDING OR CUTTING TORCH

BACKGROUND OF THE INVENTION

1. Field of the Invention

The present invention relates to an arc welding outfit of the kind comprising a torch head, a supplier or generator of electric current, means for supplying fluid and a composite cable arranged to connect the torch head to the generator and fluid supply. It is applicable in particular to low-power manual plasma cutting apparatus ignited by short-circuiting.

2. Description of the Prior Art

Arc welding outfits are known in which the composite cable has a length of the order of 6 meters, which is inadequate for some purposes, for example for jobs carried out on scaffolding.

SUMMARY OF THE INVENTION

It is an object of the invention to render it possible to make the required cable length between the torch head and the generator available in a convenient manner.

This object is achieved in accordance with the invention in an arc welding outfit of the above type in that the composite cable has an upstream end with a coupling arrangement identical to that of the torch head, whereas its downstream extremity has a coupling arrangement identical to that of the generator. It is thereupon sufficient to have available several standard composite cables with such coupling configurations, which may be joined together end to end up to the required length.

In a particularly advantageous embodiment, the torch head is straight and the apparatus comprises an elbow intended to be interposed between the torch head and a composite cable, this elbow having a coupling at each extremity which is identical to the corresponding coupling of the composite cable. A straight torch may thus be converted easily into an angled torch, and vice versa, depending on the job to be done.

The implementation of the invention is extremely uncomplicated if the torch head is a plasma cutting head ignited by short-circuiting, for example of the kind described in French Pat. Nos. 2,556,549, 2,562,453 and 2,562,748 and French patent application Nos. 85.02.553 and 85.02.554, the disclosures of which are incorporated herein by reference. In such devices, the composite cable is formed along its current length simply by a flexible tube wherein is placed a single electrical conductor; the coupling means may then be reduced to a simple joint between two metal ends, for example a screw joint, with a non-critical relative angular position between the elements placed end to end.

Further features and advantages of the welding outfit of the invention will be understood from the following detailed description, taken in conjunction with the accompanying drawings wherein preferred embodiments of the invention are illustrated.

BRIEF DESCRIPTION OF THE DRAWINGS

FIG. 1 is an elevational view, partly in section, of a plasma cutting outfit in accordance with the invention;

FIG. 2 is an elevational view, partly in section, illustrating the same outfit as FIG. 1 but showing the use of a second composite cable as an extension;

DETAILED DESCRIPTION OF THE PREFERRED EMBODIMENTS

Figure 3:
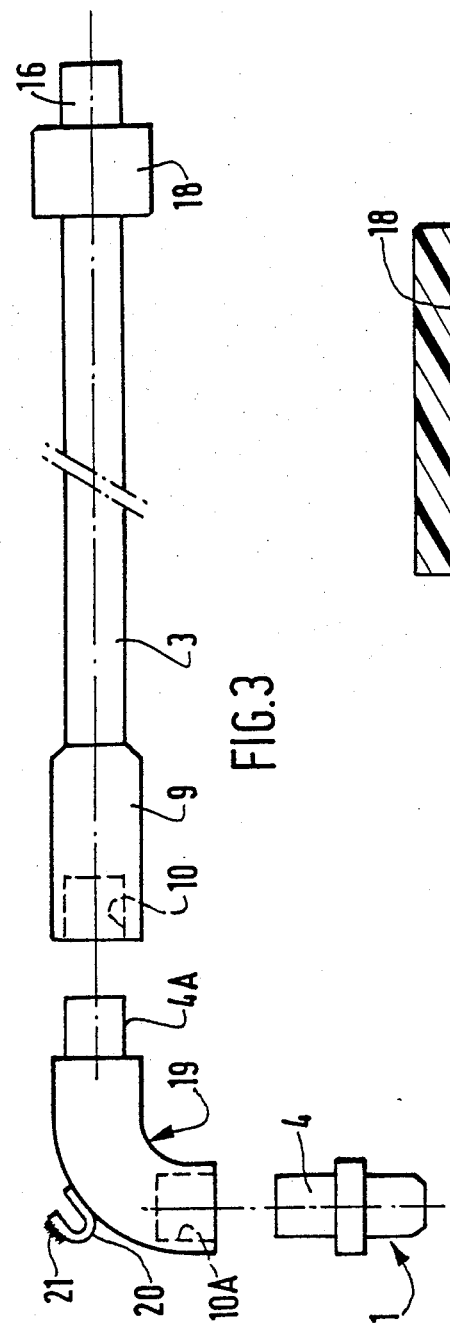
FIG. 3 is an elevational view illustrating the use of an elbow between the torch head and the adjacent composite cable.

The outfit illustrated in FIG. 1 is a low-power manual plasma arc cutting outfit essentially comprising a torch head 1, a generator 2 and a pliable composite cable 3 having a length of the order of 6 meters for example, and intended to connect the head 1 to the generator 2.

The head 1 is a torch head of the kind ignited by short-circuiting, suitably of the type described for example in the aforesaid French patents. For present purposes, it is sufficient to note that it comprises a single gas conduit or passage, for example for compressed air, and a single electrical conductor, these two elements being combined in one member which terminates at its proximal extremity in an externally screw-threaded tubular metal end 4. The torch head 1 is rectilinear however, and essentially comprises a body of revolution around the axis of the end 4.

The generator 2 is arranged to supply the head 1 with an appropriate electrical current, as well as with gas. For this purpose, it comprises an internally tapped tubular metal end 6 within a protective case 5.

In its main portion, the composite cable 3 comprises a flexible tube 7 of insulating material to carry the gas and wherein is situated a single electrical conductor 8.

At its downstream extremity (with respect to the gas flow direction), the cable 3 comprises an enlarged section 9 wherein is situated a tapped tubular metal insert 10. The downstream extremity of the conductor 8 is secured by crimping or the like on an upstream extension 11 of the insert 10.

Figure 4:
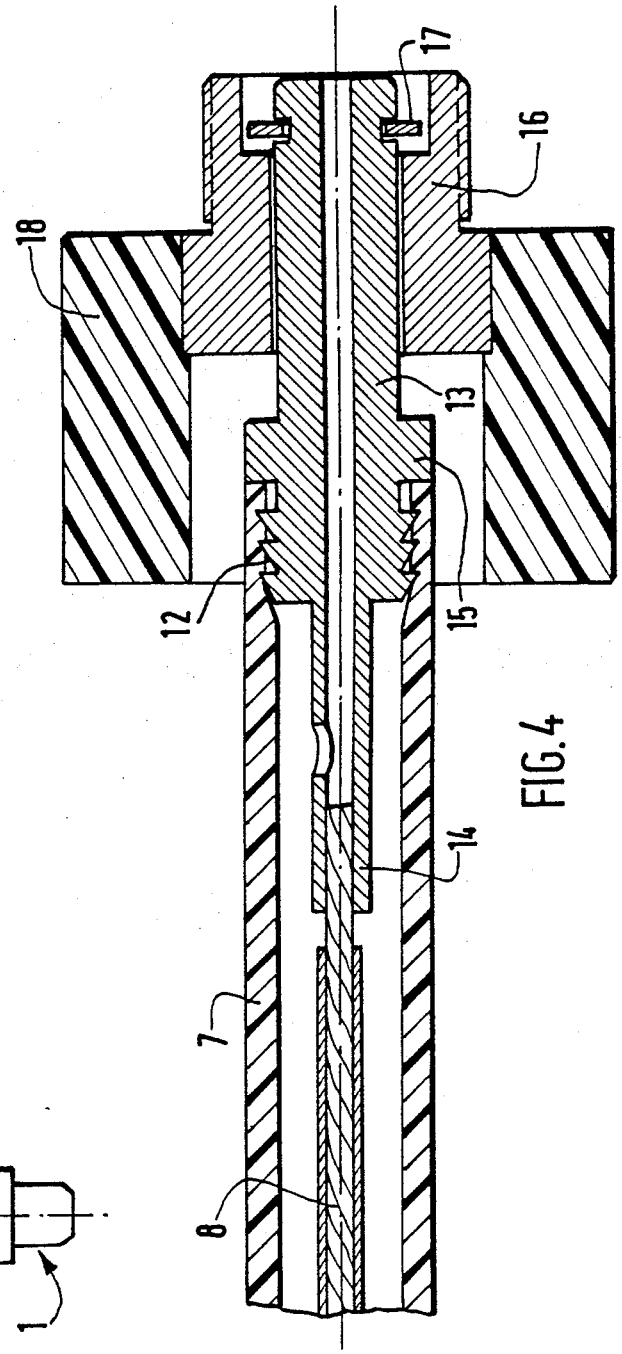
FIG. 4 illustrates the upstream extremity of a composite cable of FIGS. 1 to 3, in longitudinal cross-section, to an enlarged scale.

At its upstream end (FIG. 4), the tube is engaged in a force fit on a transversely grooved portion 12 of a tubular metal end 13. This latter has a downstream extension 14 on which the upstream extremity of the conductor 8 is secured by crimping or the like. Upstream of the portion 12, which is delimited by an external flange 15, the end 13 has a cylindrical section on which a tubular screw 16 is freely threaded; this latter is retained axially by means of a circlip 17 held in a circular groove machined close to the extremity of the end 13. The screw 16 is permanently affixed to an operating wheel 18 of insulating material which is extended downstream to beyond the flange 15.

The screw-threads of the end 4 of the head 1 and of the screw 16 are identical and, analogously, the internal screw-threads of the end 6 of the generator and of the insert 10 of the cable 3 are identical.

The basic assembly has been illustrated in FIG. 1. In use, the head 1 is connected to the downstream extremity of the cable 3 by screwing the end 4 into the insert 10, and the cable 3 is joined to the generator 2 by screwing the screw 16 into the end 6. It will be observed that thanks to the rotary assembly 16–18, this latter screwing operation does not cause any twisting of the cable 3. A straight plasma cutting torch is then available, the enlarged downstream portion 9 of the cable 3 acting as a torch handle and being situated in the extension of the head 1.

If a radius of action is needed which exceeds the 6 meters of the cable 3, a second cable 3 identical to the first is interposed either between this latter and the torch head, or between the first cable and the generator 2 as illustrated in FIG. 2. This is performed without difficulty since the screwed joints 4-10 and 16-6 are identical. The standard cable 3 thus also acts as an extension.

As illustrated in FIG. 3, the outfit may be completed by a tubular elbow 19 which can be interposed between the torch head 1 and the adjacent cable 3. This elbow, which subtends an angle of 90° in the example illustrated, is a component of plastics material provided with two metal inserts; downstream, a socket-type insert 10A analogous to the insert 10 of the cable 3 and in particular having an identical internal screw-thread, and upstream, a plug-in type insert 4A identical to the end 4 of the torch head. The inserts 10A and 4A are electrically connected by appropriate means which are not illustrated.

As illustrated, the elbow 19 may carry a hook or other suspension element 20 (or a magnetic tablet, as an alternative form). A tool for rasping the workpiece which is to be parted and intended to clear the arc striking area may also be provided at another point of the elbow; as illustrated, this tool may in particular be formed by a roughened area 21 of the hook 20.

It will be understood that a change is made from a straight torch (FIGS. 1 and 2) to an angled torch by inserting the elbow 19 between the torch head 1 and the cable 3, and by screwing the end 4 into the insert 10A and the insert 4A into the insert 10. In either case, the downstream section 9 of the cable 3 acts as a sleeve for handling the torch.

A plasma cutting outfit is thus available, which is uncomplicated, convenient and highly flexible in application; based on the fundamental layout of FIG. 1 (straight torch, range approximately 6 meters), the range may be extended at will (FIG. 2) and/or a change may be made to an angled torch (FIG. 3), and this thanks to the presence between the torch head and the generator, of a series of elements which are all adapted to be joined together one after another, by virtue of their wholly identical external and internal screw-threads.

It will be apparent to one skilled in the art that various modifications can be made within the scope of the invention. For example it would evidently be possible to provide other removable means of coupling the elements to each other such as detent devices, bayonet joints, and so on.

What is claimed is:

1. An arc welding outfit comprising:
 a torch head,
 combined means for supplying electric current and fluid and
 at least one flexible composite cable for supplying electric current and fluid from the combined supply means to the torch head,
 wherein connectors are provided on said combined supply means and on said torch head and wherein said composite cable has an upstream end with a connector identical to the connector on the torch head, adapted to be removably connected to the connector of the combined supply means, and a downstream end with a connector identical to that of the connector on the supply means, adapted to be removably connected to the connector on the torch head, the connectors on the upstream and downstream ends of the composite cable being of different configuration.

2. An outfit as claimed in claim 1 which further comprises at least two of said composite cables.

3. An outfit as claimed in claim 1 further comprising an elbow adapted to be connected between the torch head and said composite cable wherein said elbow has upstream and downstream ends provided with connectors identical to those at the upstream and downstream ends respectively of the composite cable.

4. An outfit as claimed in claim 1, wherein said connectors are screw connectors.

5. An outfit as claimed in claim 4, wherein each of the connectors on said composite cable includes a freely rotatable coupling element.

6. An outfit as claimed in claim 3, wherein said elbow carries a suspension element thereon.

7. An outfit as claimed in claim 3, wherein said elbow carries an abrasive element.

8. An outfit as claimed in claim 1, wherein the torch head is a plasma cutting head and wherein said composite cable is formed, between said connectors, by a flexible tube wherein is situated a single electrical conductor.

9. An outfit as claimed in claim 3, wherein the torch head has a straight central axis.

10. An arc welding outfit comprising:
 a torch head;
 combined means for supplying electric current and fluid;
 at least one flexible composite cable for supplying electric current and fluid from the combined supply means to the torch head, said cable having upstream and downstream ends, and
 an elbow adapted to be connected between the torch head and the downstream end of the composite cable,
 wherein said elbow has upstream and downstream ends with connectors adapted to be coupled to corresponding connectors on the cable downstream end and the torch respectively, the connector at the upstream end of the elbow being identical to the connector on the torch head and the connector at the downstream end of the elbow being identical to the said connector on the cable downstream end, the connectors on the upstream and downstream ends of the composite cable being of different configuration.

11. An outfit as claimed in claim 10, wherein the torch head has a straight central axis.

12. In an arc welding system, in combination:
 a torch head having a first connector permanently affixed thereto;
 supply means having a second connector permanently affixed thereto;
 at least one cable for connecting the supply means to the torch head and having upstream and downstream ends; and
 third and fourth connectors permanently affixed to the respective upstream and downstream ends of the cable;
 said third connector on the upstream end of the cable being removably connected to said second connector and being identical to said first connector on the torch head, and said fourth connector on the downstream end of the cable being removably connected to said first connector and being identical to said second connector on the supply means.

13. In an arc welding system as defined in claim 12, said male connectors being externally screw-threaded connectors and said female connectors being internally screw-threaded connectors.

14. In an arc welding system, in combination:
- a torch head having a first connector permanently affixed thereto;
- supply means having a second connector permanently affixed thereto;
- at least one flexible cable for connecting the supply means to the torch head and having upstream and downstream ends; and
- third and fourth connectors permanently affixed to the respective upstream and downstream ends of the cable;
- said third connector on the upstream end of the cable being removably connected to said second connector and being identical to said first connector on the torch head, and said fourth connector on the downstream end of the cable being removably connected to said first connector and being identical to said second connector on the supply means, one pair of said identical connectors being male connectors and the other pair of said identical connectors being female connectors.

* * * * *